(No Model.)
C. ERNST.
VISE.
No. 536,612. Patented Apr. 2, 1895.
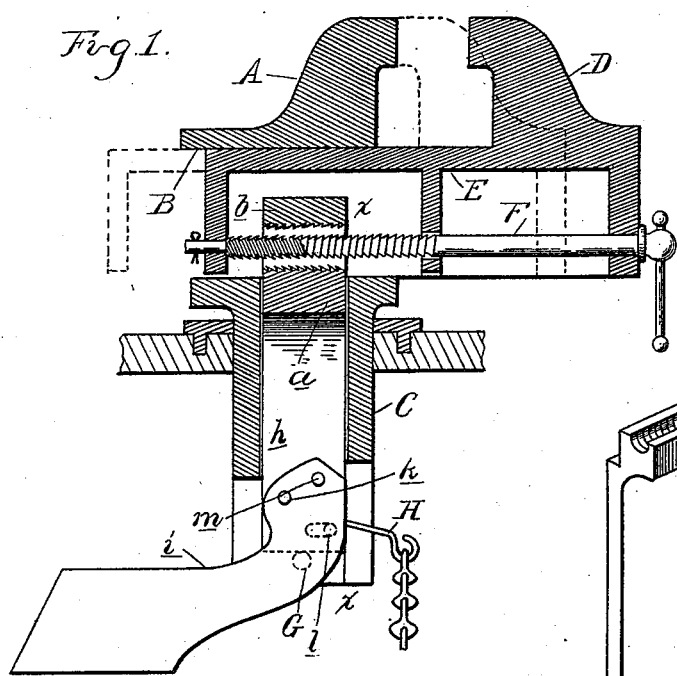
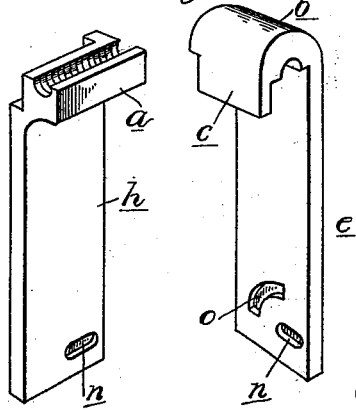
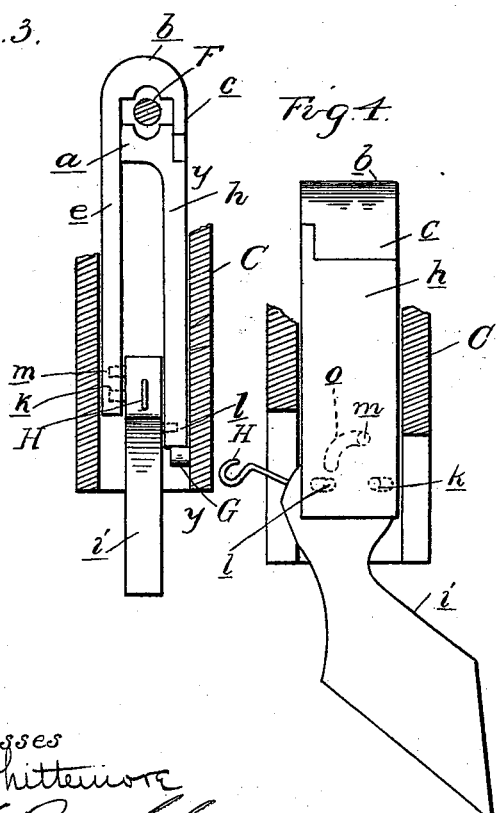
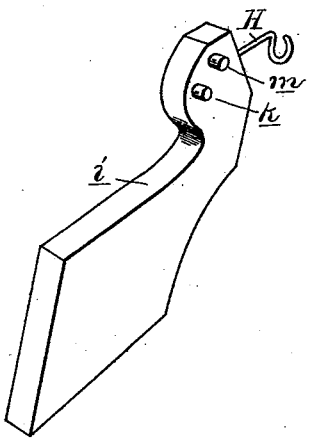
Witnesses
L. J. Whittemore
O. F. Barthel
Inventor
Clare Ernst
By Thos. S. Sprague & Son
Attys.

UNITED STATES PATENT OFFICE.

CLARE ERNST, OF BAY CITY, MICHIGAN.

VISE.

SPECIFICATION forming part of Letters Patent No. 536,612, dated April 2, 1895.

Application filed May 28, 1894. Serial No. 512,678. (No model.)

*To all whom it may concern:*

Be it known that I, CLARE ERNST, a citizen of the United States, residing at Bay City, in the county of Bay and State of Michigan, have invented certain new and useful Improvements in Vises, of which the following is a specification, reference being had therein to the accompanying drawings.

The invention relates to that class of vises in which a separable nut is used on the screw having devices for separating it to admit of quick adjustment of the jaws of the vise.

The invention consists in the construction of the nut in the stationary jaw of a vise, made in separable sections and adapted to be engaged with the jaw actuating screw, and the devices for opening, closing and automatically locking the sections closed upon the screw, all as more fully hereinafter described.

In the drawings, Figure 1 is a vertical central longitudinal section through my improved vise. Fig. 2 is a detached perspective view of the nut sections and the actuating lever therefor. Fig. 3 is a section on line $x$—$x$ Fig. 1, showing the nut sections separated and Fig. 4 is a section on line $y$ $y$ Fig. 3 showing the nut sections closed.

A is the stationary jaw, having a transverse guideway B, and the hollow vertical supporting shank C secured in the table or bench to which it is to be applied.

D is the movable jaw, having a lateral arm E engaging in the guideway B.

F is the screw, journaled in bearings in the movable jaw and its arm, and having under cut or overhanging threads, as shown in Fig. 1.

The object of the undercut threads is to act to draw the nut sections together when the screw is turned to actuate the movable jaw, and thus enable me to use simpler locking devices for such nut sections.

$a$ is the lower half of the nut or lever nut section. $b$ is the upper half of section. The section $b$ has a guide flange $c$ engaging a corresponding guideway in the section $a$. On opposite sides, the nut sections have the depending legs or plates $e$ $h$ which are vertically movable in the guideway formed in the interior of the shank C. of the stationary jaw, and forming between them a recess or guide bearing for the head of the weighted actuating lever $i$. This lever on opposite sides and at opposite edges is provided with the actuating pins or legs $k$ $l$, and on one side the locking pin $m$.

The pins $k$ and $l$ are engaged in lateral sockets $n$ at opposite edges of the legs $e$, $h$, of the nut sections, while the pin $m$ works in a segmental slot $o$ in one of the plates or legs. G is a stop pin in the hollow shank C below the bottom of the leg of the lower nut, and H is a pin connected to a foot lever (not shown) for actuating the lever.

The parts being thus constructed their operation is as follows: In the normal position of the parts shown in Fig. 4 the weighted end of the lever tends to turn the lever about an imaginary pivot between the two pins $k$ $l$ thus moving the pin $k$ up and the pin $l$ down, thus holding the nut sections together. The pressure of the screw would tend to separate the nut sections and might actuate the lever if it were not locked, and this I preferably accomplish by arranging the pin $m$ entering one leg in such relation to the pin on the other leg, as to prevent a separation of the nut sections at the top by a vertical strain applied thereto, except the lever be first rocked in the manner described. Now to open the nut section to admit of shifting the movable jaw freely without turning the screw, the operator depresses the foot lever which rocks the lever, $i$. The pin in the upper nut section will act first as the fulcrum about which it turns, and the lower section will be moved downward until the leg thereof strikes the stop pin G, when the fulcrum is shifted to the pin in the lower section, and further movement of the lever shifts the upper nut upwardly away from the shaft. The pin $m$ in the meantime works in the slot $o$.

What I claim as my invention is—

1. In a vise, the combination with a hollow supporting shank, a stationary jaw, a movable jaw, a screw for actuating the movable jaw, a two-part nut embracing the screw, depending legs on opposite sides of the nut sections extending into the shank, a weighted lever between the legs on the nuts, lateral projections rigidly secured on opposite sides of and on opposite edges of the lever engaging bearings in the legs, and means on the lever for preventing the movement of the legs, substantially as described.

2. In a vise, the combination with the jaws, the screw and the tubular shank C, of the nut sections $a$ $b$ embracing the screw having legs extending into the shank C and guided therein, one of said legs having a curved slot in its inner face of a weighted lever having pins on opposite sides engaging in bearings in the opposite edges of the legs, a locking pin $m$ on the lever engaging in the segmental slot and means for rocking the lever.

3. In a vise, the combination with a fixed jaw having a hollow supporting shank, of a sliding jaw, a screw for actuating the movable jaw, depending legs on the stationary jaw, a divided nut having oppositely movable sections, and a weighted lever having rigidly fixed thereon a plurality of lateral projections arranged eccentric and on different planes and engaging respectively the members of the nut, substantially as described.

In testimony whereof I affix my signature in presence of two witnesses.

CLARE ERNST.

Witnesses:
H. H. HATCH,
E. A. COOLEY.